Nov. 4, 1930.   W. H. HENDERSON   1,780,821
PROCESS OF AND APPARATUS FOR SLAKING LIME
Filed April 6, 1928   2 Sheets-Sheet 2
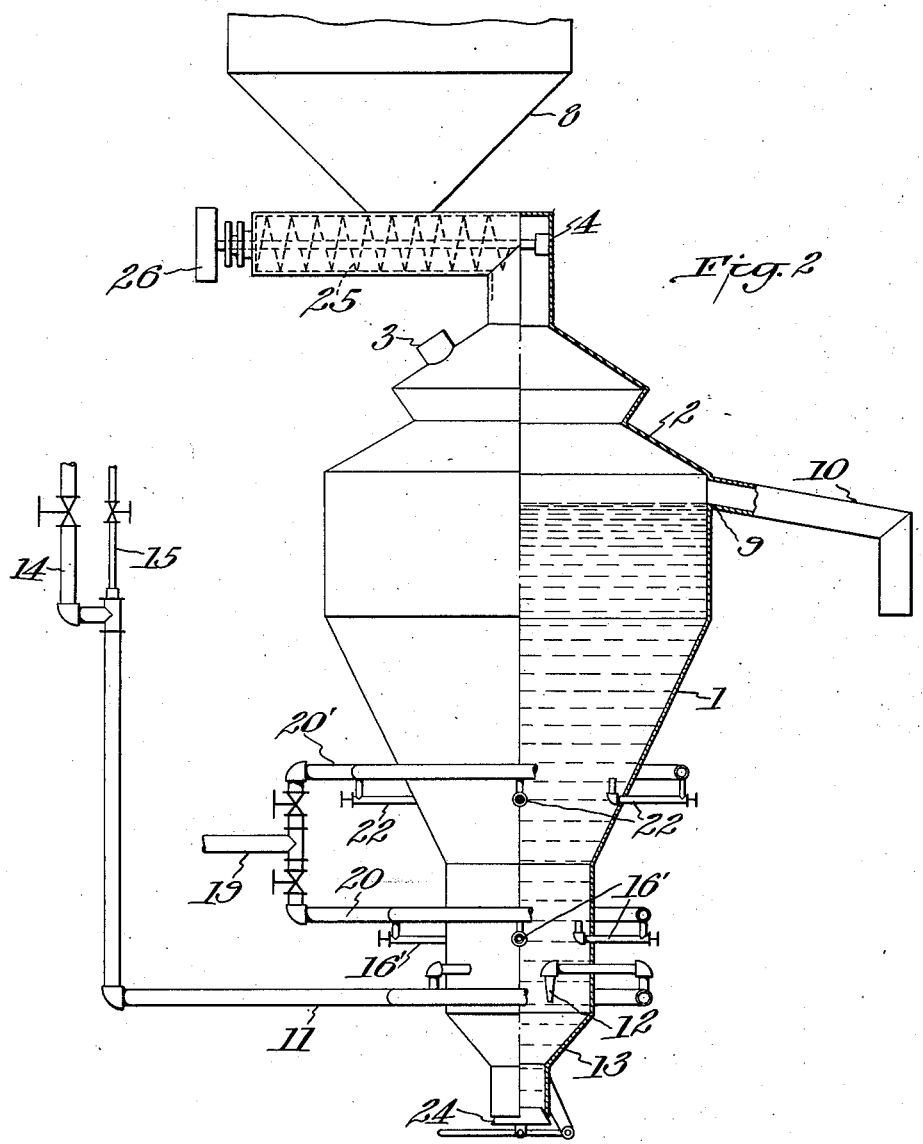

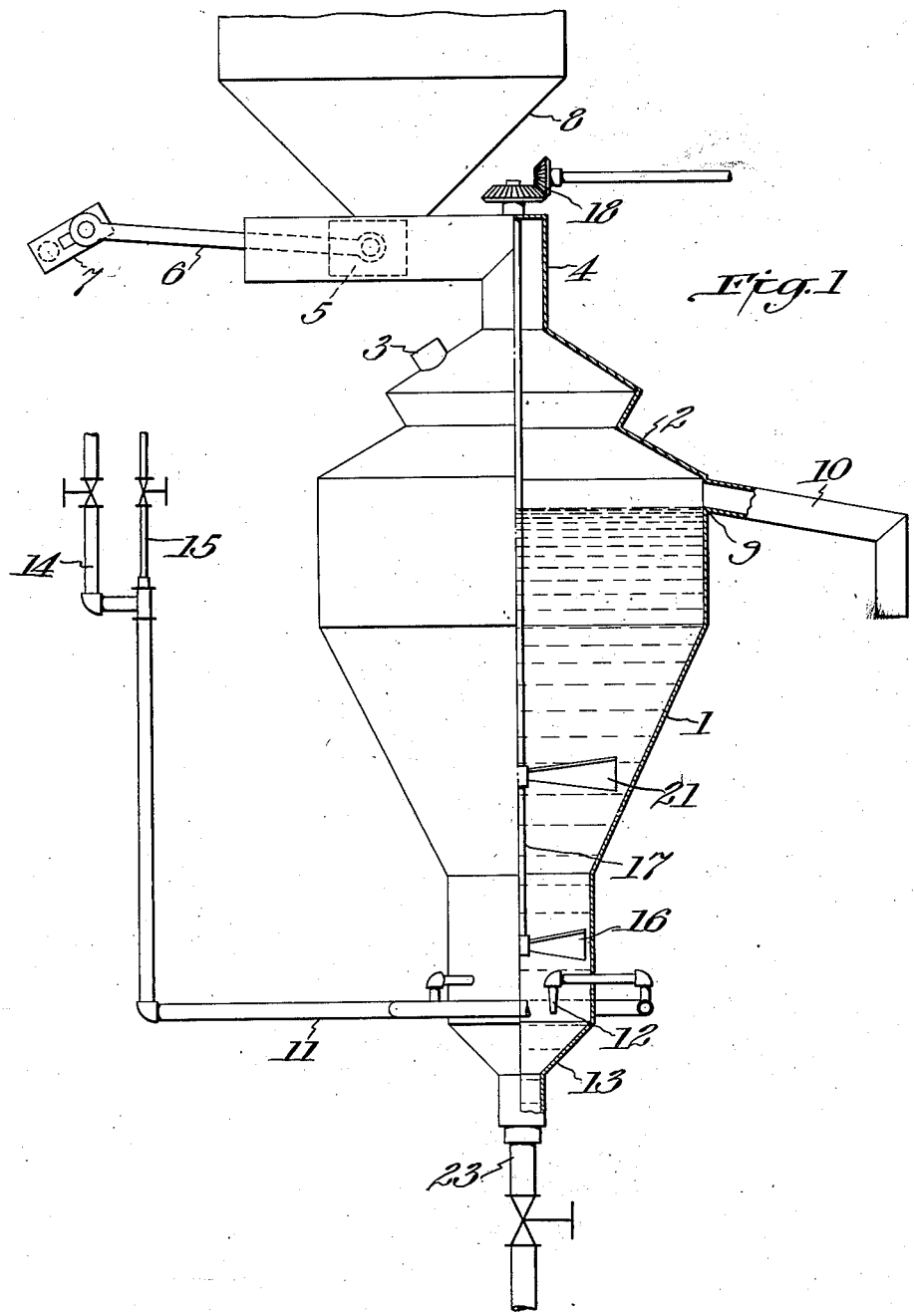

Patented Nov. 4, 1930

1,780,821

UNITED STATES PATENT OFFICE

WILLIAM H. HENDERSON, OF YOUNGSTOWN, OHIO

PROCESS OF AND APPARATUS FOR SLAKING LIME

Application filed April 6, 1928. Serial No. 267,934.

The present invention relates to processes for the extraction of soluble material from a material containing soluble and insoluble components, and the simultaneous hydraulic separation of the insoluble components from the soluble components in solution; more particularly, it resides in a process of and apparatus for preparing milk of lime from quick lime and simultaneously hydraulically separating the insoluble residue therefrom.

By "milk of lime" is meant a suspension of calcium hydroxide in a saturated aqueous solution of calcium hydroxide; i. e., a suspension of calcium hydroxide in less water than is required for its complete solution. The suspended calcium hydroxide may be in collodial or pseudo-colloidal form. By "insoluble residue" is meant those components of the quick lime which resist solution when agitated in water or a dilute aqueous solution of calcium hydroxide, including any insoluble foreign matter.

In brief, my process comprises establishing an upwardly moving body of aqueous liquid having a generally progressively decreasing rate of flow, continuously countercurrently adding quick lime thereto in regulated amounts and at a regulated rate, thoroughly agitating the liquid and the lime and promoting hydration and solution of the soluble components of the latter in the lower zone of the body, continuously hydraulically segregating the insoluble residue at the base of the body of liquid and continuously or intermittently removing said segregated insoluble material from beneath the base of said body of liquid, and continuously abstracting liquid with its dissolved and suspended solids (i. e., the milk of lime product) at the top of the body of liquid.

To promote the efficiency of the slaking procedure, steam may be added to the water used in establishing the body of aqueous liquid, or steam may be introduced into said body. The thorough agitation of the liquid and the lime may be effected by any suitable means; for example, by means of a propeller agitator positioned somewhat above the base of the upwardly moving body of aqueous liquid,—preferably within the lower zone thereof,—or the agitation may be effected by means of air introduced into said body at a point or points within the lower zone thereof.

Preferably, to the moving body of aqueous liquid is given the general form of an inverted cone; that is to say, a moving body wherein the lower zone moves at a relatively faster rate than does the upper zone. The disintegration of the added solid (i. e., quick lime), the agitation thereof with the solvent (i. e., water) and the hydration of the soluble constituents of the disintegrated solid occurs for the most part in said lower zone, while in the upper, quieter, zone occurs the necessarily slow step of saturating the aqueous calcium hydroxide solution.

The process will be described in greater detail in connection with the following description of apparatus adapted for carrying out the process and embodying my invention, forms of which apparatus are illustrated in the accompanying drawings in which Fig. 1 is an elevation partly in section of an apparatus according to my invention; and Fig. 2 is an elevation partly in section of a modified form of the same.

Similar reference characters refer to similar parts throughout the several views.

Referring to the drawings, the numeral 1 designates the slaker vessel or body of my slaker apparatus which consists, preferably, of a vessel having generally the form of an inverted cone, which vessel may be constructed from sheet-metal (e. g., steel or iron), galvanized iron, or other suitable material. Surmounting the vessel 1 there is positioned the cover 2, preferably provided with a suitable vent 3. Communicating with vessel 1 by way of cover 2 is the charging device which may, and preferably does, consist of the conduit 4, the charge feeder mechanism composed of piston 5, connecting rod 6, and the adjustable stroke crank 7 connected to a suitable source of power (not shown), and the charge hopper 8. Reference numeral 9 designates a conventional dam breast, and 10 designates an overflow conduit. A supply pipe 11 is connected to a plurality of conventional jets 12 positioned in the vessel 1 at a point near the apex 13 thereof, which supply pipe may have separate valved connections 14 and 15 to sources of water and steam respectively.

Positioned within vessel 1 and near the base thereof but above the jets 12 is the agitation means. This may take the form of a conventional paddle agitator 16 connected to a source of power through the agitator shaft 17 and gear mechanism 18. Or, it may take the form of a plurality of air jets 16' connected to a compressed air line 19 by the valved air supply pipe 20. Whatever may be the type of agitation means employed, it preferably should be so positioned with respect to vessel 1 that its action may have the greatest effect in the zone just above the water supply jets 12.

In order to prevent objectionable settling of solids on the sloping sides of the vessel 1 above the zone of agitation, I preferably provide a supplemental suspension means which, as indicated in Fig. 1, may take the form of a paddle agitator 21 connected to the shaft 17, or, as indicated in Fig. 2, may take the form of a plurality of air jets 22 connected to the compressed air line 19 by the valved air supply line 20'.

The invention embraces the conception of using one type of agitation means and a different type of supplemental suspension means: thus, I may employ as the agitation means a paddle agitator such as is indicated by reference numeral 16 in Fig. 1 and as the supplemental suspension means a plurality of air jets such as are indicated by reference numerals 22 in Fig. 2, or vice versa, or, I may employ wholly paddle agitation or wholly air agitation.

Beneath the apex 13 and in cooperation therewith is located any suitable valved discharge means for segregated solids,—such as the conventional valved discharge pipe 23 of Fig. 1, or the draw-off plug valve 24 of Fig. 2.

The operation of my slaker apparatus is as follows: the vessel 1 is filled with water through supply pipe 11 and jets 12 to about the level of the dam breast 9,—preferably, the temperature of the water is raised by admission of steam through the valved connection 15. Then, with the agitation means in operation, quick lime from hopper 8 is discharged continuously at a regulated rate into vessel 1 through conduit 4 by means of the charging device 5—6—7; at the same time, water continuously is admitted through the jets 12.

The lime falls through the liquid in vessel 1 and is brought together in the agitation zone, where, due to the joint agitation from the water jets 12 and the agitation means per se, the particles of lime are subjected to a vigorous and prolonged agitation accompanied by an "abrasive" action between the particles, thus effecting the complete liberation of the soluble and/or suspensible components of the lime from the insoluble residue. The soluble and/or suspensible components are carried upwards by the ascending current of liquid into the upper and quieter zone, where saturation of the liquid with the soluble components is completed and the resulting milk of lime overflows the dam breast 9 through conduit 10 to a point of storage or use, while the insoluble residue is segregated hydraulically in the apex 13. Periodically, or continuously, this segregated insoluble residue is removed through the valves discharge means.

For the charging device 5—6—7 of Fig. 1, I may with facility employ the equivalent screw feed 25—26 illustrated in Fig. 2, in which 25 represents a conventional screw conveyor actuated by power delivered to pulley 26.

It is, of course, to be understood that the rate of feeding the quick lime, the rate of admission of aqueous liquid, the rate of discharge of insoluble residue and the degree of agitation should be so regulated with respect to each other that substantially no insoluble residue is carried out with the milk of lime product, and substantially no soluble components of the lime are carried out through the insoluble residue discharge.

Since the flow of liquid is upward and since the particles of insoluble material descend by force of gravity against the upward flow of the liquid, a milk of lime product is obtained which is reasonably pure (i. e., substantially free from insoluble foreign material).

The following data relates to a specific apparatus embodying my invention. The vessel's upper cylinder has a diameter of 4 feet and an effective height below the dam breast of 15 inches. The cone frustrum beneath the upper cylinder has a lower diameter of 18 inches and a height of 30 inches. The lower cylinder is 18 inches high. In this vessel I have slaked from 100 to 1005 pounds of quick lime per hour. Normally, for a milk of lime product having a concentration of solute equivalent to 60 grams CaO per liter (i. e., "6% solids") approximately 480 pounds of quick lime are slaked per hour, requiring from about 7000 to about 8000 pounds of water. Depending somewhat upon the desired concentration of the milk of lime product and the relative activity of the quick lime, there is a variable rise in temperature between the admitted water and overflowed milk of lime, normally, in slaking at the rate of 480 pounds per hour with production of the "6% solids" milk of lime, using water at 50° C., the temperature of the overflowed product is about 60° C. or slightly in excess thereof. In preparing a product having a lower concentration of solids, and/or using a relatively inactive lime, it will of course be obvious that best slaking efficiency necessitates the use of heated water or the addition of steam into the body of liquid in the slaker.

I claim:

1. Process for the production of milk of lime from quick lime which comprises establishing an upwardly moving body of aqueous liquid having a progressive decreasing regulated rate of flow, countercurrently adding thereto quick lime containing hydratable and soluble solids and an insoluble residue in regulated amounts and at a regulated rate, thoroughly agitating the liquid and the lime and promoting hydration and solution of the hydratable and soluble components of the lime in a lower zone of said body, hydraulically segregating the insoluble residue at and removing the same from beneath the base of said body, and abstracting aqueous liquid with its dissolved and suspended solids at the top of said body.

2. Lime slaking apparatus including, in cooperation with a vessel having suitable outlets and enclosing a space of progressively increasing cross-sectional area from base to top thereof, means for feeding solids into said top, agitation means positioned within the vessel and nearer the bottom than the top thereof, means for introducing liquid at a point near the bottom and directed against the bottom of said vessel whereby to cause further agitation, means for removing insoluble solids from beneath the base, and means for overflowing liquid from the top.

In testimony whereof, I affix my signature.

WILLIAM H. HENDERSON.